United States Patent
Ansley

(10) Patent No.: US 10,291,301 B2
(45) Date of Patent: May 14, 2019

(54) RECTANGULAR ELEMENT ARRAY PROVIDING DYNAMIC WIRELESS COVERAGE

(71) Applicant: ARRIS Enterprises LLC, Suwanee, GA (US)

(72) Inventor: Carol J. Ansley, Johns Creek, GA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 16/053,791

(22) Filed: Aug. 2, 2018

(65) Prior Publication Data

US 2019/0052318 A1 Feb. 14, 2019

Related U.S. Application Data

(60) Provisional application No. 62/542,450, filed on Aug. 8, 2017.

(51) Int. Cl.
| | |
|---|---|
| *H01Q 21/06* | (2006.01) |
| *H04B 7/0426* | (2017.01) |
| *H04W 16/28* | (2009.01) |
| *H01Q 21/10* | (2006.01) |
| *H04W 24/02* | (2009.01) |

(52) U.S. Cl.
CPC ......... *H04B 7/043* (2013.01); *H01Q 21/065* (2013.01); *H01Q 21/10* (2013.01); *H04W 16/28* (2013.01); *H04W 24/02* (2013.01)

(58) Field of Classification Search
CPC .................. H01Q 21/061; H04B 7/0608
USPC ......... 375/295, 296; 342/372, 374; 343/853, 343/824
See application file for complete search history.

(56) References Cited

U.S. PATENT DOCUMENTS

| | | | |
|---|---|---|---|
| 2002/0196185 A1* | 12/2002 | Bloy | G01S 3/04 342/435 |
| 2014/0139373 A1* | 5/2014 | Tseng | H01Q 3/36 342/374 |
| 2016/0028451 A1 | 1/2016 | Hu et al. | |

OTHER PUBLICATIONS

PCT International Search Report & Written Opinion, RE: Application No. PCT/US2018/045285, dated Nov. 16, 2018.

* cited by examiner

*Primary Examiner* — Kevin Kim
(74) *Attorney, Agent, or Firm* — Bart A. Perkins

(57) ABSTRACT

Methods, systems, and computer readable media can be operable to facilitate dynamic wireless coverage through adaptive use of a rectangular array of antenna elements. A rectangular array of elements may be adaptively utilized to create a customized transmission/reception pattern that is based upon wireless device placement, premise layout, and other characteristics associated with a subscriber premise within which an access point is located.

20 Claims, 4 Drawing Sheets

RECTANGULAR ELEMENT ARRAY PROVIDING DYNAMIC WIRELESS COVERAGE

CROSS REFERENCE TO RELATED APPLICATION

This application is a non-provisional application claiming the benefit of U.S. Provisional Application Ser. No. 62/542,450, entitled "Using a Rectangular Element Array for In-Home Coverage," which was filed on Aug. 8, 2017, and is incorporated herein by reference in its entirety.

TECHNICAL FIELD

This disclosure relates to a rectangular element array providing dynamic wireless coverage.

BACKGROUND

One or more access points located within a subscriber premise may provide wireless communications and/or services to one or more stations configured to communicate with the one or more access points. Stations may include WLAN (wireless local area network) systems configured to transmit and receive wireless communications from an access point or other wireless device. The WLAN systems may include a plurality of antennas, wherein each of the antennas may include a receiver and/or transmitter for facilitating the receiving and/or transmitting of wireless communications over a wireless communication medium. With multiple antennas, a station may be configured to communicate over a plurality of spatial streams by utilizing a plurality of transmit and receive chains.

Devices using millimeter wave frequencies, such as in the 60 GHz unlicensed band, face a tradeoff problem with antenna arrays. If an array is used with a high number of elements, a high level of gain can be achieved, essentially focusing the transmissions in a small area (the same focusing effect occurs for receive operations as well). If an antenna array with a small number of elements is used, the antenna's main beam width is wider, though providing a lesser amount of gain.

Another challenging aspect is that the most commonly used arrays are square, with the same number of elements in rows and columns. While this arrangement is straightforward, it tends to produce an antenna transmission (or reception) pattern that is roughly circular, but within most rooms in a home, an oval pattern is more desirable. Further, energy that is sent into the ceiling or floor for 60 GHz is often wasted since the most likely arrangement of target devices is within a few degrees above and below the wireless access point.

Therefore, it is desirable to improve upon methods and systems for providing dynamic wireless coverage.

BRIEF DESCRIPTION OF THE DRAWINGS

Like reference numbers and designations in the various drawings indicate like elements.

DETAILED DESCRIPTION

Methods, systems, and computer readable media can be operable to facilitate dynamic wireless coverage through adaptive use of a rectangular array of antenna elements. A rectangular array of elements may be adaptively utilized to create a customized transmission/reception pattern that is based upon wireless device placement, premise layout, and other characteristics associated with a subscriber premise within which an access point is located.

Figure 1:
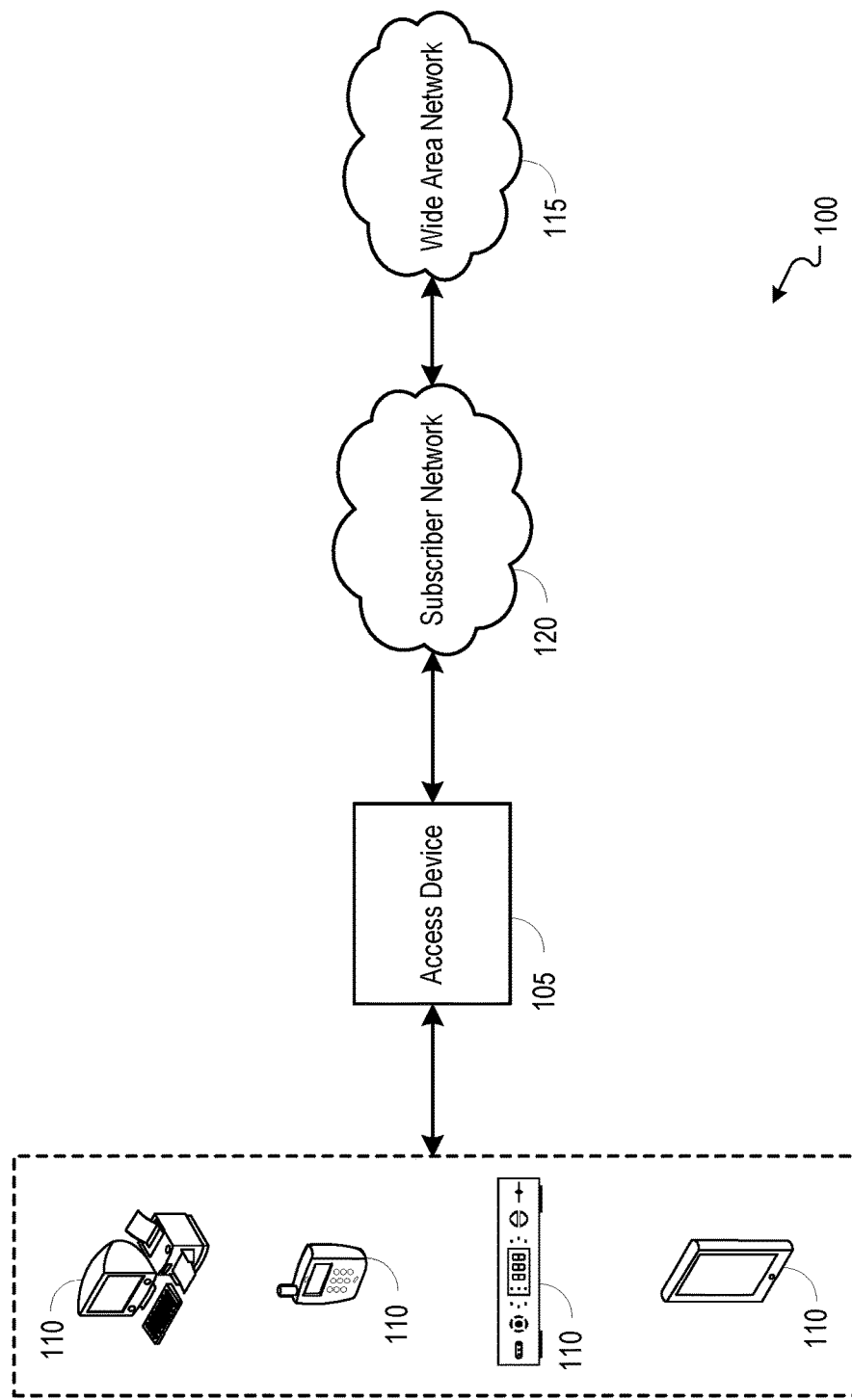
FIG. 1 is a block diagram illustrating an example network environment operable to facilitate dynamic wireless coverage through a rectangular element array.

FIG. 1 is a block diagram illustrating an example network environment 100 operable to facilitate dynamic wireless coverage through a rectangular element array. In embodiments, an access device 105 may route communications to and from one or more stations 110. For example, the one or more stations 110 may be provisioned to receive video service(s), data service(s), voice service(s), home security service(s), and/or other services through one or more access devices 105. In embodiments, an access device 105 may include a gateway, a cable modem, a wireless router including an embedded cable modem, a mobile hot-spot router, a multimedia over coaxial alliance (MoCA) node, a wireless extender, and any access point or other device that is operable to route communications to and from a station 110.

In embodiments, stations 110 may include a wide variety of devices such as televisions, mobile devices, tablets, set-top boxes, computers, telephones, security devices, and any other device that is capable of utilizing a wireless video, data, telephony, or security service, or that is otherwise capable of transmitting and/or receiving wireless communications. Stations 110 may include device components or modules (e.g., wireless form factors) that are configured to facilitate the passing of wireless communications between a host device (e.g., the device to which the component or module is attached) and an access device 105.

In embodiments, an access device 105 may route communications between stations 110 and a WAN 115 via a subscriber network 120. The subscriber network 120 may include various networks such as Ethernet (e.g., CAT5/CAT6), coaxial cable, optical fiber, twisted pair network, satellite networks, mobile networks including 4G and LTE, and others.

In embodiments, a station 110 may include one or more radio antennas, or other interface module configured to transmit and/or receive wireless communications. The station 110 may include a plurality of radio antennas, or other interfaces, thereby allowing the station 110 to receive and/or transmit wireless communications associated with multiple wireless streams.

Figure 2:
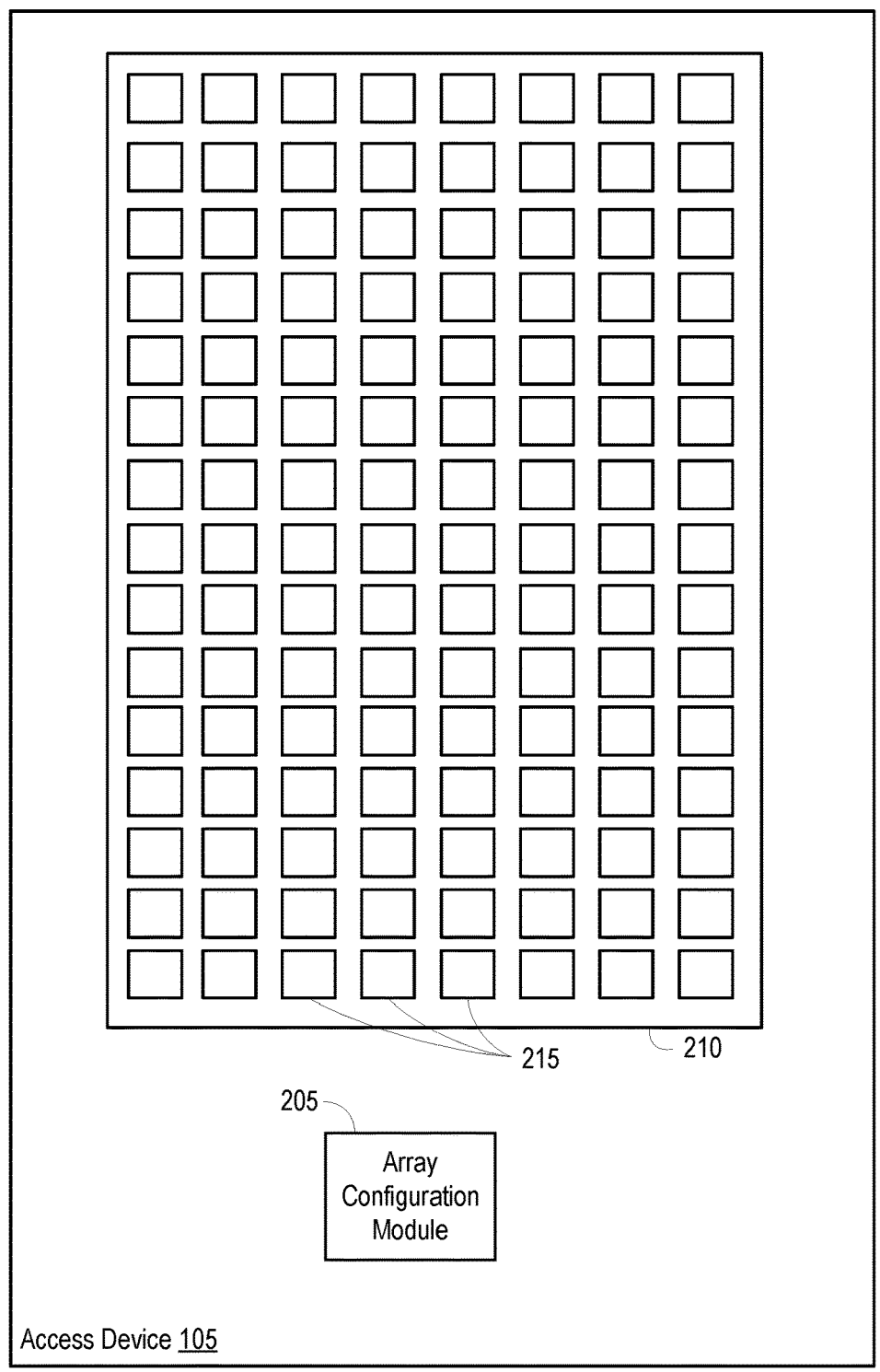
FIG. 2 is a block diagram illustrating an example access device operable to facilitate dynamic wireless coverage through a rectangular element array.

In embodiments, an access device 105 may include one or more antennas having a rectangular array of elements, wherein the elements of the array are positioned within the array to form a rectangle. To form the rectangle, the elements of the array may be positioned within the array such that a horizontal external dimension of the array is greater than a vertical external dimension of the array. For example, an array with 128 antenna elements may be positioned in an 8×16 grid pattern, as illustrated in FIG. 2. In other embodiments, a keystone grid arrangement might be used, or an ellipsoidal arrangement.

In embodiments, the rectangular array of elements may be utilized to create a customized transmission/reception pattern that is adapted to access device placement (e.g., placement of access device 105 within a premise), wireless device placement (e.g., placement of the one or more stations 110 within a premise), premise layout (e.g., position of walls or open spaces), and other characteristics associated with a subscriber premise within which an access device 105 is located.

In embodiments, using the rectangular array of elements, the transmission and/or reception pattern may be elongated (when compared to a square pattern) along the long axis of the antenna, thereby concentrating more energy in an area within which one or more stations 110 are located or are expected or likely to be located.

In embodiments, the access device 105 may tune the spread of the transmission and/or reception pattern to match one or more desired transmission characteristics. For example, where it is desirable for an access device 105 to communicate with a station 110 requiring a high signal strength (e.g., where a station 110 is not near the access device 105, where one or more barriers are located between a station 110 and access device 105, etc.), the access device 105 may use the entire array of elements (e.g., the entirety of the 8×16 array) to form a focused beam that also provides high gain. As another example, where a wider arc is desirable to communicate, at a high gain, with a plurality of stations 110, the access device 105 may use a partial array of elements (e.g., an 8×8 section of the 8×16 array). As yet another example, where it is desirable for an access device 105 to communicate with a plurality of stations 110 that are near in proximity to the access device 105 but with a wider angle of spread (e.g., stations 110 that are located within the same room as the access device 105), the access device 105 may use a still smaller sub-array of elements (e.g., a 4×6 section of the 8×16 array). Using the sub-array of elements, the transmit power may be spread across a wider area of arc than would be possible when the full array of elements is used. A 4×4 array may have a wider beam width compared to the 8×16 array, thereby creating more reflections from ceilings and walls.

In embodiments, an access device 105 may modify a transmission and/or reception pattern of an antenna by enabling and/or disabling certain elements of an element array. It will be appreciated by those skilled in the relevant art that various techniques and methods may be used to switch one or more elements of an element array on and off to achieve a desired array configuration. Those skilled in the art would also appreciate that the design of the power amplifiers behind the array of antenna elements may have to perform well across a wide range of power settings to allow the overall array to operate close to the allowed power levels whether a small number of array elements are active or all of the array elements are active.

FIG. 2 is a block diagram illustrating an example access device 105 operable to facilitate dynamic wireless coverage through a rectangular element array. The access device 105 may include an array configuration module 205 and an antenna 210 which includes a plurality of elements 215.

In embodiments, the elements 215 may be positioned within the antenna 210 in an array, wherein the array of elements 215 forms a rectangle. For example, the elements 215 may be positioned within the array in an 8×16 pattern.

In embodiments, the array configuration module 205 may utilize the rectangular array of elements 215 to create a customized transmission/reception pattern that is based upon wireless device placement (e.g., placement of the one or more stations 110 of FIG. 1 within a premise), premise layout, and other characteristics associated with a subscriber premise within which the access device 105 is located. For example, using the rectangular array of elements 215, the transmission and/or reception pattern may be elongated (when compared to a square pattern) along the long axis of the antenna 210, thereby concentrating more energy in an area within which one or more stations 110 are located or are expected or likely to be located.

In embodiments, the array configuration module 205 may tune the spread of the transmission and/or reception pattern to match one or more desired transmission characteristics. For example, where it is desirable for an access device 105 to communicate with a station 110 requiring a high signal strength (e.g., where a station 110 is not near the access device 105, where one or more barriers are located between a station 110 and access device 105, etc.), the access device 105 may use the entire array of elements (e.g., the entirety of the 8×16 array) to form a focused beam that also provides high gain. As another example, where a wider arc is desirable to communicate, at a high gain, with a plurality of stations 110, the access device 105 may use a partial array of elements (e.g., an 8×8 section of the 8×16 array). As yet another example, where it is desirable for an access device 105 to communicate with a plurality of stations 110 that are near in proximity to the access device 105 but with a wider angle of spread (e.g., stations 110 that are located within the same room as the access device 105), the access device 105 may use a still smaller sub-array of elements (e.g., a 4×6 section of the 8×16 array).

In embodiments, the array configuration module 205 may modify a transmission and/or reception pattern of the antenna 210 by enabling and/or disabling certain elements 215 of the array. It will be appreciated by those skilled in the relevant art that various techniques and methods may be used to switch one or more elements 215 of the array on and off to achieve a desired array configuration.

Figure 3:
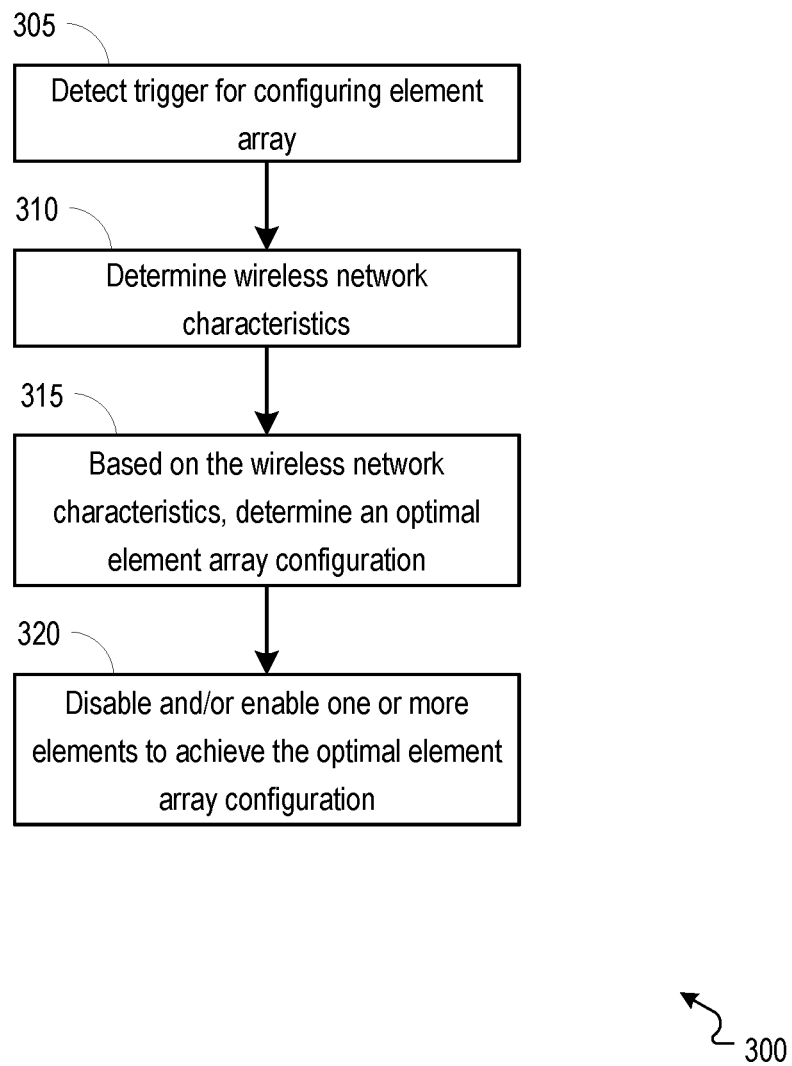
FIG. 3 is a flowchart illustrating an example process operable to facilitate dynamic wireless coverage through a rectangular element array.

FIG. 3 is a flowchart illustrating an example process 300 operable to facilitate dynamic wireless coverage through a rectangular element array. In embodiments, the process 300 may be carried out by an access device 105 of FIG. 1. The process 300 may start at 305, when a trigger for configuring an element array is detected. The trigger for configuring an element array may be detected, for example, by the access device 105 (e.g., by an array configuration module 205 of FIG. 2). In embodiments, the trigger for configuring an element array may be the initialization of access device 105 or a change occurring with respect to a wireless network that is associated with the access device 105, such that this change may be detected by the array configuration module 205. For example, a change with respect to a wireless network may include an addition or removal of one or more stations 110 of FIG. 1 that are connected to or that communicate with the access device 105, a change in the position or location of one or more stations 110 associated with the access device 105, and/or other changes. Alternatively, changes within the premises may trigger a change in the configuration of the element array, for instance when a reflective or absorptive feature (such as a mirror) is moved. Additionally, since a communication session may involve one or more stations 110, the number of stations targeted simultaneously may also trigger a change in the configuration of the element array. For example, when a plurality of stations 110 (e.g., multiple mobile devices) move closer together while actively streaming data, a change in the configuration of the element array may be triggered to allow each of the plurality of stations 110 to be targeted in a single transmission. If the stations 110 were alternatively to move apart to the point where they cannot both be served together, a change in antenna configuration may also be triggered.

At 310, one or more wireless network characteristics may be determined. The one or more wireless network characteristics may be determined, for example, by the access device 105 (e.g., by the array configuration module 205). In embodiments, the array configuration module 205 may identify one or more characteristics of a wireless environment associated with the access device 105 or with the stations 110 associated with the access device 105. For example, the one or more characteristics of a wireless network associated with the access device 105 may include an identification of a number, position (e.g., location relative to the access device 105 and/or the stations 110 themselves), and/or type of stations 110 that are connected to, in communication with, or otherwise associated with the access device 105. The location of stations 110 may be measured by angular spread and distance relative to each other and/or relative to the access device 105. As another example, the one or more characteristics of a wireless network associated with the access device 105 may include an identification of service types or data rates requested by the one or more stations 110 associated with the access device 105. Wireless network conditions may be determined through the use of standard sounding techniques or other customized training sequences may be used. It should be understood that the one or more characteristics of a wireless network associated with the access device 105 may include a variety of other characteristics.

At 315, an optimal element array configuration may be determined, wherein the optimal element array configuration is determined based upon the wireless network characteristics. The optimal element array configuration may be determined, for example, by the access device 105 (e.g., by the array configuration module 205). The access device 105 may adaptively calculate an antenna configuration and/or the access device 105 may have a stored database or table of configurations. In the case of a stored database, the access device 105 may determine the best antenna configuration by selecting a certain parameter for optimization, then determining which stored configuration optimizes that parameter with respect to the current conditions. The access device 105 may determine an optimal element array configuration (e.g., an optimal configuration of enabled and/or disabled elements of the element array) based upon one or more associations between element array configurations and wireless network characteristics. The one or more associations between element array configurations and wireless network characteristics may be identified by the array configuration module 205 from the stored database or table of configurations.

At 320, the optimal element array configuration may be implemented at the element array of the access device 105. In embodiments, to implement the optimal element array configuration, one or more elements may be disabled and/or enabled to achieve the optimal element array configuration. The one or more elements may be disabled and/or enabled, for example, by the access device 105 (e.g., by the array configuration module 205). The one or more elements (e.g., elements 215 of FIG. 2) may be elements of an array of elements, wherein the elements are positioned within the array to form a rectangle. In embodiments, the array configuration module 205 may enable and/or disable one or more of the elements so that the optimal element array configuration is achieved. The optimal element array configuration may be a pattern of enabled elements that is determined to be optimal for servicing the one or more stations 110 within the wireless network environment associated with the access device 105.

Figure 4:
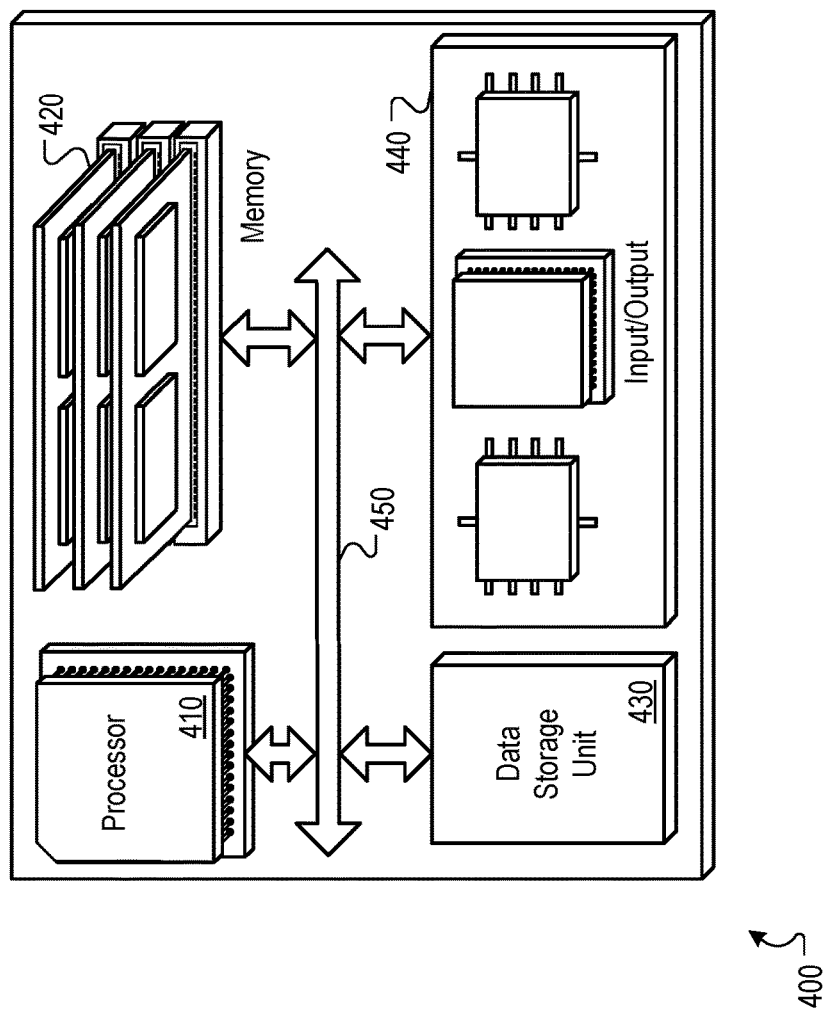
FIG. 4 is a block diagram of a hardware configuration operable to facilitate dynamic wireless coverage through a rectangular element array.

FIG. 4 is a block diagram of a hardware configuration 400 operable to facilitate dynamic wireless coverage through a rectangular element array. It should be understood that the hardware configuration 400 can exist in various types of devices. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). In embodiments, the input/output device can include driver devices configured to send communications to, and receive communications from one or more networks (e.g., subscriber network 120 of FIG. 1, WAN 115 of FIG. 1, local network, etc.) and/or one or more access devices (e.g., access devices 105 of FIG. 1) and/or stations (e.g., stations 110 of FIG. 1).

Those skilled in the art will appreciate that the invention improves upon methods and systems for providing wireless coverage. Methods, systems, and computer readable media can be operable to facilitate dynamic wireless coverage through adaptive use of a rectangular array of antenna elements. A rectangular array of elements may be adaptively utilized to create a customized transmission/reception pattern that is based upon wireless device placement, premise layout, and other characteristics associated with a subscriber premise within which an access point is located. While this invention has been presented in terms of WLAN applications, those skilled in the art would appreciate that other wireless applications are equally compelling, such as 5G New Radio (NR) small cell applications.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

I claim:

1. A method comprising:
    detecting a trigger for configuring an element array of an antenna that is associated with an access device;
    determining one or more characteristics of a wireless network associated with the access device;
    based on the one or more characteristics of the wireless network, determining an optimal configuration of one or more enabled elements of the element array; and
    implementing the optimal configuration of one or more enabled elements of the element array of the antenna.

2. The method of claim 1, wherein the trigger for configuring the element array comprises a change with respect to the wireless network associated with the access device.

3. The method of claim 1, wherein the element array of the antenna comprises an element array with a horizontal external dimension greater than a vertical external dimension of the element array.

4. The method of claim 1, wherein the one or more characteristics of the wireless network comprise a location of one or more stations relative to the access device.

5. The method of claim 1, wherein implementing the optimal configuration of one or more enabled elements of the element array comprises enabling one or more elements of the element array of the antenna.

6. The method of claim 1, wherein implementing the optimal configuration of one or more enabled elements of the element array comprises disabling one or more elements of the element array of the antenna.

7. The method of claim 1, wherein determining the optimal configuration of one or more enabled elements of the element array comprises identifying the optimal configuration as an element array configuration that is associated with one or more of the determined characteristics of the wireless network.

8. An access device comprising:
    an antenna comprising an element array; and
    an array configuration module that:
        detects a trigger for configuring the element array;
        determines one or more characteristics of a wireless network associated with the access device;

based on the one or more characteristics of the wireless network, determines an optimal configuration of one or more enabled elements of the element array; and
implements the optimal configuration of one or more enabled elements of the element array.

9. The access device of claim 8, wherein the trigger for configuring the element array comprises a change with respect to the wireless network associated with the access device.

10. The access device of claim 8, wherein the one or more characteristics of the wireless network comprise a location of one or more stations relative to the access device.

11. The access device of claim 8, wherein implementing the optimal configuration of one or more enabled elements of the element array comprises enabling one or more elements of the element array of the antenna.

12. The access device of claim 8, wherein implementing the optimal configuration of one or more enabled elements of the element array comprises disabling one or more elements of the element array of the antenna.

13. The access device of claim 8, wherein determining the optimal configuration of one or more enabled elements of the element array comprises identifying the optimal configuration as an element array configuration that is associated with one or more of the determined characteristics of the wireless network.

14. One or more non-transitory computer readable media having instructions operable to cause one or more processors to perform the operations comprising:
   detecting a trigger for configuring an element array of an antenna that is associated with an access device;
   determining one or more characteristics of a wireless network associated with the access device;
   based on the one or more characteristics of the wireless network, determining an optimal configuration of one or more enabled elements of the element array; and
   implementing the optimal configuration of one or more enabled elements of the element array of the antenna.

15. The one or more non-transitory computer-readable media of claim 14, wherein the trigger for configuring the element array comprises a change with respect to the wireless network associated with the access device.

16. The one or more non-transitory computer-readable media of claim 14, wherein the element array of the antenna comprises an element array with an external horizontal dimension greater than an external vertical dimension of the element array.

17. The one or more non-transitory computer-readable media of claim 14, wherein the one or more characteristics of the wireless network comprise a location of one or more stations relative to the access device.

18. The one or more non-transitory computer-readable media of claim 14, wherein implementing the optimal configuration of one or more enabled elements of the element array comprises enabling one or more elements of the element array of the antenna.

19. The one or more non-transitory computer-readable media of claim 14, wherein implementing the optimal configuration of one or more enabled elements of the element array comprises disabling one or more elements of the element array of the antenna.

20. The one or more non-transitory computer-readable media of claim 14, wherein determining the optimal configuration of one or more enabled elements of the element array comprises identifying the optimal configuration as an element array configuration that is associated with one or more of the determined characteristics of the wireless network.

* * * * *